Feb. 15, 1966  R. DE VOGHEL  3,235,283
DIFFERENTIAL STEERING MEANS FOR TOWED OR
SELF-PROPELLED VEHICLES
Filed July 15, 1963  5 Sheets-Sheet 1

INVENTOR
RAYMOND DE VOGHEL

BY *Corey Hart + Stemple*
ATTORNEYS

INVENTOR
RAYMOND DE VOGHEL

INVENTOR

RAYMOND DE VOGHEL

BY Corey Hart & Stemple
ATTORNEYS

INVENTOR
RAYMOND DE VOGHEL

United States Patent Office 3,235,283
Patented Feb. 15, 1966

3,235,283
DIFFERENTIAL STEERING MEANS FOR TOWED OR SELF-PROPELLED VEHICLES
Raymond De Voghel, Marcinelle, Belgium, assignor to Glaverbel, Brussels, Belgium, a Belgian company
Filed July 15, 1963, Ser. No. 294,813
Claims priority, application Belgium, July 13, 1962, 495,389, Patent 620,230
24 Claims. (Cl. 280—91)

The invention relates to a steering differential for towed or self-propelled vehicles which permits of the unlimited turning of the steerable wheels, the number of which may be equal to or less than the total number of wheels.

Present steering mechanisms in such vehicles are generally based on the well-known principle of the deformable trapezium, which has a number of disadvantages owing to the fact that it only provides an approximate and limited solution to the problem of turning vehicles. The application of this principle permits of only very limited turning angles for the steerable wheels, is responsible for the slipping of the tyres thus causing the tyres to be prematurely worn, and is also the cause of torsional stresses affecting the chassis and the steering parts. Having to be arranged half-way up the height of the wheels, the deformable trapezium requires the mounting of the wheels on stub axles and stub axle pivots centered differently from the centre of the wheels, which has given rise to a number of imperfect correcting arrangements, such as camber and toeing-in of the wheels, resulting in retarding the forward movement of the vehicle and the shifting of the vehicle when turning the wheels in the stopped state. The vehicle is also raised owing to the modifications in the inclination of the stub axle pivots, which is a serious disadvantage particularly for heavy vehicles, requiring excessive demultiplication of the steering gear which has to overcome the various resistances.

The present inadequacy of the turning angles for the wheels has given rise to a series of well known compromises principally bringing the front and rear wheel sets closer together. Here, the stability and comfort of the vehicle are sacrificed for some additional mobility which in any case is insufficient. This is particularly regrettable in the case of vehicles such as long luxury vehicles, lorries and motor coaches, since the length of these vehicles cannot be used to the best account as it should be in order to ensure comfort and stability. Such comfort is then aimed at by increasing the weight of the vehicle, but this results in a loss of handiness, a need for additional driving power, higher consumption of fuel, and increases in the cost of the vehicle concerned.

The steering differential according to the invention completely eliminates all these disadvantages and compromises. It permits of differentiation of the turning of the steerable wheels at any instant so that at all the wheels of a towed or self-propelled vehicle, the plane of each wheel is always perpendicular to a straight line connecting the centre of the wheel to the centre of the turning circle of the vehicle, which obviates all slipping of the tyres. Owing to this steering differential, the wheel need no longer be necessarily mounted on a stub axle pivot, and a vertical steering pivot can be arranged above the wheels, permitting the elimination of the limitations imposed by camber and toeing-in and the disadvantages of braking effects, shifting of the vehicle when stopped and torsional stresses on the chassis which have to be overcome at the steering wheel. It permits the unlimited turning of the steerable wheels and placing the wheels at the outer limits of the vehicle, thus giving increased useful space, stability and mobility to the vehicle, and also eliminating any kind of compromise between mobility and stability on the one hand and mobility and comfort on the other hand. Furthermore, the absence of steering or directing elements between the steerable wheels, such as front axle track rods, permits of a maximum undersling.

However, the apparatus according to the invention also makes it possible to keep the planes of all the wheels parallel to one another for advancing the vehicle in a straight line in any desired direction, modifiable at any instant by means of the steering wheel or draw bar.

According to the invention, the steering differential compriss in a casing pairs of cranks wherein the cranks of each pair are connected to one another by a link articulated to their crank pins, and whereof one of the cranks of each pair is fixed to a common driven shaft and the other is mounted on one of two shafts which are offset in parallel manner with respect to the driven shaft and issue from the casing to transmit the rotational movement received to the pivots of vertical forks wherein the steerable wheels rotate; the rotational movement received by the outgoing shafts having been differentiated, with respect to the rotational movement of he driven shaft, by the pairs of cranks either differently so as to bring the planes of the steerable wheels substantially perpendicularly to straight lines passing through the centre of the wheels and the centre of the turning circle of the vehicle, or identically in such a manner as to bring the planes of all the wheels parallel to one another in order to obtain rectilinear movement of the vehicle in any one direction.

For vehicles whose end wheels at either side of the longitudinal central axis of the vehicle have the same wheel base, all the cranks are of the same length which is identical to the length of the links, and the offset outgoing shafts are at the same distance from the driven shaft. If the wheel base is different on either side of the longitudinal axis, it is possible either to provide pairs of cranks and links whose length is proportional to that of the different wheel bases, or to position the outgoing shafts at different distances from the driven shaft, these distances being then proportional to the wheel bases. The driven shaft and the offset outgoing shaft are preferably arranged in one and the same plane.

The offset outgoing shafts can be positioned on either side of the driven shaft. This arrangement of the outgoing shafts, in three parallel lines makes it possible to provide a steering differential for moving the vehicle in the direction of its longitudinal axis or along any curved line when the pairs of cranks are arranged at one and the same side of the plane of the shafts, the links being parallel to one another in one and the same plane when the planes of the steerable wheels are parallel to the longitudinal axis of the vehicle. The offset outgoing shafts may, however, also be situated at one and the same side of the driven shaft, aligned if the wheel base of the end wheels is identical on either side of the longitudinal axis of the vehicle. In this case, there is obtained a steering differential which, as previously, makes it possible to move the vehicle in the direction of its longitudinal axis or in accordance with any curved line, when the pairs of cranks are arranged on either side of the plane of the shafts, the links being parallel to one another in two parallel planes when the planes of the steerable wheels are parallel to the longitudinal axis of the vehicle.

The rotational movements of the outgoing shafts may be transmitted to the pivots of the forks of the steerable wheels either by means of bevel gearwheels or by means of toothed wheels and chains, or by a combination of bevel gearwheels and toothed wheels and chains. A toothed wheel is advantageously arranged on the driven shaft between the cranks fixed to this shaft; it is acted upon either by a worm mounted on the steering shaft carrying the steering wheel or by a toothed wheel on which the draw bar acts.

In a first form of embodiment of a steering differential according to the invention suitable for a vehicle all of whose wheels are steerable, the bearings of the driven shaft are adapted to be displaced laterally by any appropriate means such as a lever. By this movement of the bearings it is possible, optionaly, either to offset the outgoing shafts relatively to the driven shaft in order to permit the vehicle to advance in the direction of its longitudinal axis or along any curved line, or to bring the driven shaft into line with the outgoing shafts in order to maintain the planes of all the wheels parallel to one another in order to permit movement of the vehicle in a straight line in any direction, modifiable at any instant by means of the steering wheel or draw bar.

This arrangement has the advantage of providing a vehicle which can manoeuvre in a very restricted space, for example in narrow and winding passages in workshops and factory sheds which have heavy and bulky objects in them, advancing selectively either by optionally modifying the direction of the longitudinal axis of the vehicle or maintaining this axis in one and the same direction and moving the vehicle parallel to itself.

When the transmission of the rotational movements of the outgoing shafts of the casing is effected by shafts and bevel gearwheels, the shafts communicating these movements to the pivots of the forks either of the front wheels or of the rear wheels comprise two opposed bevel gearwheels which are alternately adapted to mesh with the bevel gearwheel of the pivot of the fork of these wheels, in order to rotate the pivots of all the wheels in the same sense when the driven shaft and the outgoing shafts are in the aligned position, or to rotate the pivots of the forks of the rear wheels in a direction opposite to that of the pivots of the forks of the front wheels when the outgoing shafts are in an offset position relatively to the driven shaft. The opposed bevel gearwheels can then be mounted on sleeves adapted to slide on their shaft and to be driven by a means co-operating with the means for displacing the bearings of the driven shaft, such as a rod means articulated to the lever controlling the movement of these bearings.

An equivalent apparatus is provided when the transmission of the rotational movements of the outgoing shafts is effected by toothed wheels and chains. In this case, the apparatus comprises also a double chain tensioner adapted to give alternatively to one or other chain a slack which is intentionally given to the said chain. In this way, it is possible advantageously to compensate by the slack in the chain for the stresses which are produced during the displacement of the bearings of the driven shaft by the modification of the angle between the two cranks of each pair of cranks, which stresses, if the chains were tensioned, would cause undesirable rotation of the pivots of the forks and therefore detrimental modification of the orientation of the wheels.

In a further form of embodiment of a steering differential according to the invention, which is also suitable for a vehicle all of whose wheels are steerable, the four cranks of the two pairs of cranks are all incorporated in toothed wheels whereof the two inner are mounted at least one freely on the shaft previously referred to as the driven shaft, and the two outer are fixed on the outgoing shafts which have an invariable amount of offset relatively to the first shaft and are arranged in line on one and the same side of the first shaft. Each of the pairs of toothed wheels, connected to one another by a link, is adapted to be driven by one of two sliding gearwheels which are mounted on a shaft operated by the steering wheel or draw bar and adapted to be moved laterally in opposite directions. In this way, the sliding gearwheels mesh either with the inner toothed wheels in order to constitute a steering differential permitting the vehicle to advance in the direction of its longitudinal axis or along any curved line, or with the outer toothed wheels mounted on the outgoing shafts in order to constitute an apparatus keeping the planes of the wheels parallel to one another, permitting rectilinear movements of the vehicle in every direction, after, of course, reversing the direction of rotation of the pivots of the front or rear wheels in order to rotate all the pivots of the forks in the same direction, as described hereinbefore.

In a third form of embodiment of the invention, again for vehicles all of whose wheels are steerable, the steering differential comprises three pairs of cranks, the cranks of each pair being, as described hereinbefore, connected to one another by a link articulated to their crank pins. One of the cranks of each pair is fixed on a common driven shaft, one near one end of the shaft and the two others near the other end of the shaft, arranged on either side of the plane of the shafts in different directions. The other cranks of each pair are mounted one of them fixedly on an outgoing shaft with invariable offset, and the two others freely on the said outgoing shaft, also with an invariable amount of offset, these two cranks being adapted to be engaged alternately on the shaft in order that one shall drive the outgoing shaft and the other remain free. Considering, by way of example, only the case where the outgoing offset shafts are arranged in line at one and the same side of the driven shaft, the steerable wheels can be turned to an unlimited extent for moving the vehicle along its longitudinal axis or along any curved line when the engageable crank engaged on the offset shaft is arranged at the other side of the plane of the shafts from the crank which is fixed to the other offset shaft; on the contrary, the planes of the wheels are made parallel to one another for a rectilinear movement of a vehicle in any one direction when the engageable crank engaged on the offset shaft is arranged on the same side of the plane of the shafts as the crank fixed to the other offset shaft.

Several forms of embodiment of the invention are illustrated diagrammatically by way of example in the accompanying drawings.

Figure 6:
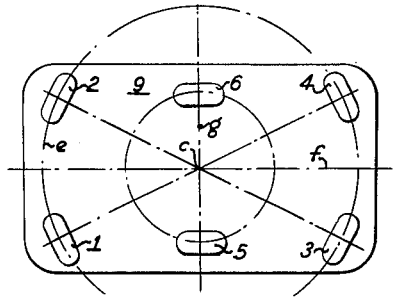
FIGURE 6 shows a vehicle having six wheels four of which are steerable and two can be driven wheels.

A vehicle provided according to the invention with a steering differential comprises steerable wheels 1 and 2 (FIGURE 2), or 1, 2, 3, and 4 (FIGURE 3) or a greater number of steerable wheels or even, but not necessarily, non-steerable wheels 5 and 6 (FIGURE 6) which can be driving wheels, which are preferably mounted in a straight fork 7 (FIGURE 1) fast with a vertical pivot 8 rotating freely in the platform 9 of the vehicle or in a bearing fixed to the platform, so that the wheel can be turned through any angle which may be as much as or greater than 360 degrees. A resilient suspension element 10 of any desired type can be interposed between the fork 7 and the platform 9. The fork 7 can comprise two limbs connected at their ends by a horizontal stub shaft 11 about which the wheel hub rotates, or a single limb in which the shaft 11 is engaged at one of its ends.

The turning of the wheels is controlled for example by bevel gearwheels 12 and 13 (FIGURE 1) the first of which is mounted on the pivot 8 and the second on a shaft 14 which receives its rotational movement directly or indirectly from the steering differential. In some cases which will be explained hereinafter, the direction of rotation of the pivot 8 must be reversed. The bevel gearwheel 13 is then mounted for example on a sleeve 15 rotating with the shaft 14 but adapted to be moved longitudinally on the shaft by means of a double lever 16 controlled by a rod 17. The sleeve carries a bevel gearwheel 13' opposite the gearwheel 13, one or other of which meshes with the gearwheel 12 in accordance with the desired direction of rotation for the pivot 8.

The transmission of the desired turning effect to the wheels can of course be carried out by any means equivalent to bevel gearwheels, for example chains and chain wheels.

In principle, the steering differential has the object of imparting differentiated steering to the planes of the wheels in such a manner that in the case of all the steerable wheels the perpendicular to these planes passes through the centre of the turning circle of the vehicle.

Thus, for a four-wheeled vehicle whose wheels 1 and 2 (FIGURE 2) are steerable, the perpendiculars $a$ to the plane of the wheel 1 and $b$ to the plane of the wheel 2 meet at the centre of the turning circle $c$ situated on the perpendicular $d$ to the parallel planes of the non-steerable wheels 3 and 4. The wheels move on arcs $1e$, $2e$, $3e$ and $4e$. The wheels 1 and 2 can be turned to an unlimited extent and therefore the centre of the turning circle $c$ can be made very close to the vehicle, which gives the vehicle an extraordinary manoeuvring mobility making it possible to take the vehicle out of a line of vehicles in a single manoeuvre even if the space between the preceding vehicle and the following vehicle is only slightly greater than the length of the vehicle which is to be taken out. If the centre of the turning circle $c$ were to coincide with the fixed pivot 8 of the wheel 3, the plane of the wheel 1 would be parallel to the straight line $d$, that of the wheel 2 perpendicular to the diagonal between the centres of the wheels 2 and 3, and the wheels 1, 2 and 4 would describe arcs of circles about the fixed pivot of the wheel 3. It would even be possible to have the centre of the turning circle $c$ in the fixed pivot of the wheel 4, which would make the plane of the wheel 2 parallel to the straight line $d$ and would make the wheel 3 withdraw when the wheels 1 and 2 advance.

Figure 2:
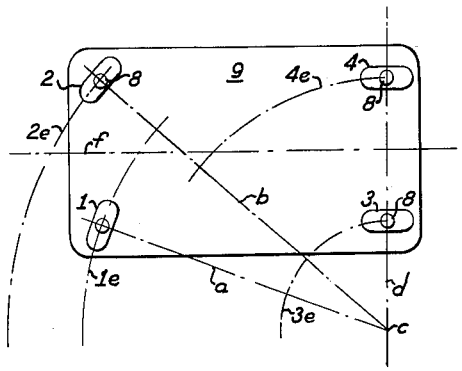
FIGURE 2 shows the turning of the steerable wheels of a vehicle provided with a steering differential according to the present invention.

If the wheels 3 and 4 of a vehicle according to FIGURE 2 are driving wheels, they are conveniently equipped with a differential transmitting drive to the wheels such as to permit one of the wheels to be locked whilst the other is driven in one or other direction, or each of the wheels 3 or 4 can be driven in a different direction, which makes it possible to position the centre of the turning circle between the pivots 8 of the wheels 3 and 4. It will be apparent that the vehicle advances in a straight line when, on the straight line $d$, the centre of the turning circle is situated at "infinity" either to the left or to the right of the longitudinal central axis $f$ of the vehicle.

The steering differential according to the invention permits of the easy construction of vehicles having four steerable wheels each of which can be turned through an unlimited angle, such that the straight lines $a$, $a'$, $b$ and $b'$, perpendicular to the planes of the wheels 1, 2, 3 and 4 (FIGURE 3) meet on the straight line $g$ constituting the transverse central axis of the vehicle. In this case, the centre of the turning circle $c$ can be taken on any point of the straight line $g$ from "infinity" to the left to "infinity" to the right of the vehicle; the wheels 2 and 4 move along the same arc $2e$ and the wheels 1 and 3 on the same arc $1e$.

Figure 3:
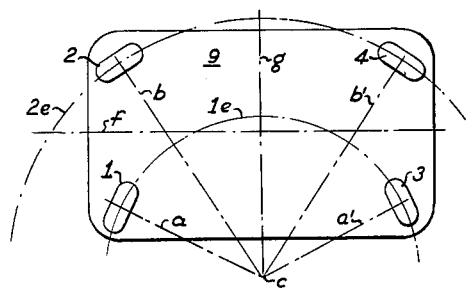
FIGURES 3, 4 and 5 show several possibilities of turning the wheels of a vehicle having four steerable wheels.
Figure 4:
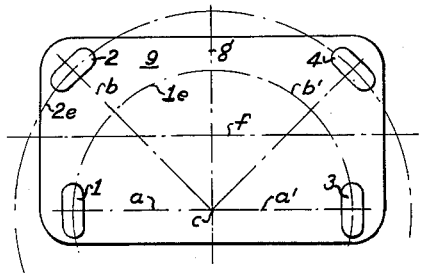

FIGURE 4 shows a special case where the centre of the turning circle $c$ is at the intersection of the straight lines $g$ and $a$, the latter coinciding with the straight lines $a$ and $a'$ of FIGURE 3, and the planes of the wheels 1 and 3 being parallel to the straight line $g$.

Figure 5:
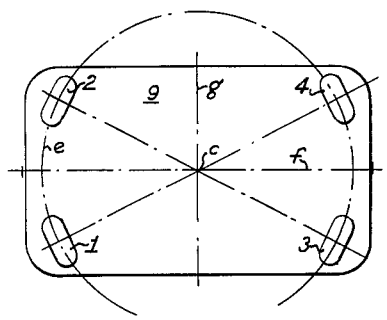

Another special case is shown in FIGURE 5. Here, the centre of the turning circle $c$ is situated at the intersection of the longitudinal median axis $f$, and tranverse central axis $g$, and the vehicle turns about its own centre and all the wheels move along arcs of one and the same circle $e$. This arangement may be advantageous for special vehicles which carry for example hoisting gear or armament such as guns, and which are to be capable, with the same facility, of moving in a straight line, turning along any arc of a circle and rotating about their own centre.

In the case of vehicles having four steerable wheels, the question of driving the wheels presents a special problem.

Although this problem is secondary to the invention, it will be pointed out that it can be solved by individual driving of some or all of the wheels, for example by an electric or hydraulic motor acting on the wheel. A more conventional solution would consist in positioning a pair of wheels 5 and 6 (FIGURE 6) on the transverse central axis $g$, these wheels being driven by a drive-transmitting differential whereby the said wheels 5 and 6 can be driven in opposite directions.

Figure 7:
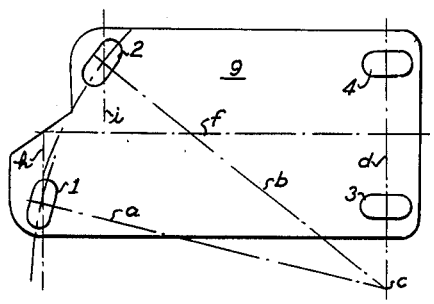
FIGURES 7 and 8 show vehicles which have different wheel bases on either side of the longitudinal central axis.
Figure 8:
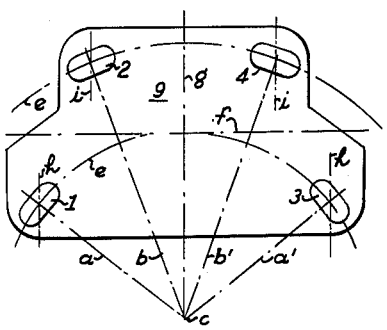

The steering differential according to the invention also permits of other adaptations of vehicles having two or more steerable wheels to particular conditions of use. For example, it may happen that the vehicle is intended to carry very long, wide and rather thin heavy loads which have to be stood on edge on the platform leaning against an oblique frame, or cases where a vehicle is intended to receive a piece of working mechanism of a considerable length which operates only at one side of the vehicle, such as lifting gear. In all these cases, a vehicle having a rectangular apron would not be very easily handled owing to its length and could no be used in sheds and workshops having narrow passages with sharp bends. The handling ability of such vehicles is substantially increased if the wheels at one side of the vehicle are given a different wheel base length from that of the wheels at the other side, for example as FIGURES 7 and 8 show, in order to reduce the length of the vehicle at the side where it is not restricted by the dimensions of the tool or the load.

When the vehicle comprises two steerable wheels 1 and 2 (FIGURE 7) whose straight lines $h$ and $i$ perpendicular to the central axis $f$ and coming from the centre of the wheels are offset relatively to one another, the turning of the wheels by the steering apparatus is such that the straight lines $a$ and $b$, perpendicular to the planes of the wheels are offset relatively to one another, the turning of circle $c$ although the wheel base of the wheels 1 and 3 is greater than that between the wheels 2 and 4. The same is true when the wheels 1 to 4 are steerable (FIGURE 8) and the straight lines $a$, $b$, $a'$ and $b'$ have their common intersection on the straight line $g$ to the centre of the turning circle $c$.

The steering differential according to the invention also makes it possible to make the planes of all the wheels parallel to one another, which makes it possible to provide vehicles which can carry out rectilinear movements in any one direction which is modifiable at any instant by means of the steering wheel or draw bar. As it is possible to make a selective choice between a mode of movement according to one or more of FIGURES 2 to 5, 7 and 8, and FIGURE 9, the vehicles provided with a steering differential which will be described hereinafter are given an extraordinary lateral mobility.

Figure 10:
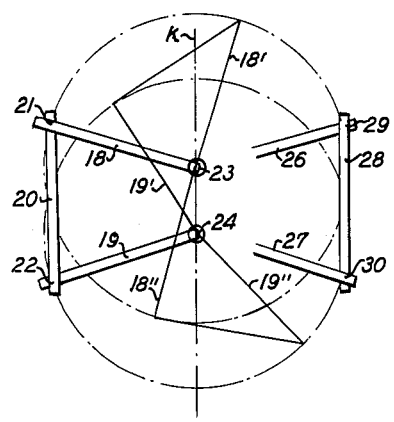
FIGURE 10 shows the principle used in this steering differential for differentiating the steering of the wheels.
Figure 9:
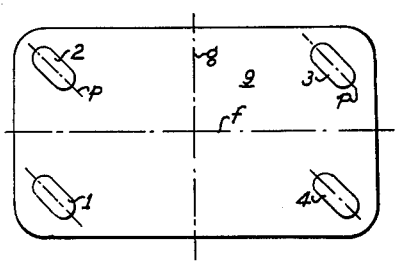
FIGURE 9 shows a four-wheel vehicle the planes of whose wheels are parallel to one another, a position which can be obtained by means of the steering differential according to the invention.

The steering differential is based on the principle of the differentiated relative displacement of two cranks 18 and 19 (FIGURE 10) which are connected to one another by a link 20 articulated to their crank pins 21 and 22, and rotate one on the shaft 23 and the other on a shaft 24, these shafts being normally parallel to one another. The rotational movement of one of the shafts is controlled and the rotational movement of the other is then the result of the movement of its crank which is obligated by the link to follow the movement of the crank mounted on the driven shaft. It will be assumed that the shaft 23 is the driven shaft and that it effects a rotational movement in the clockwise direction through, for example a quarter of a revolution. The crank 18, which is then moved into the position 18′ through 90 degrees, has, by means of the link 20, entrained the crank 19 which now occupies the position 19′. FIGURE 10 shows that the displacement of the crank 19 is less than 90° and that consequently the rotational movement of the shaft 24 is less than a quarter of a revolution. If the direction of rotation of the shaft 23 is counter-clockwise, its rotational movement through a quarter of a revolution brings the crank 18 onto the position 18″ and the crank 19 is obliged to move into the position 19″; it is found that in this case the angle enclosed by the cranks 19 and 19″ is more than 90 degrees and the shaft 24 has been obliged to carry out a rotational movement through more than a quarter of a revolution. The differentiation of the rotational movements of the driven shaft increases and decreases progressively relatively to the continuous rotational movement of the driven shaft, so as to become nil after one complete revolution.

Based on this principle, there is obtained a steering differential which is capable of turning the steerable wheels of a vehicle such as is shown in one of FIGURES 2 to 6 in such a manner that the planes of the steerable wheels are substantially perpendicular to the straight lines passing through the centres of the wheels and through the centre of the turning circle of the vehicle. For this purpose the steering differential comprises in a casing 25 (FIGURES 11 and 12) two pairs of cranks 18–19 and 26–27 and links 20 and 28 articulated to the crank pins 21 and 22, 29 and 30 respectively. One of the cranks of each pair, for example the cranks 18 and 26, are fixed to the ends of the shaft 23 which is driven by a gear wheel 31 engaged for example by a worm 32 mounted on a shaft 33 carrying the steering wheel. In the case of a towed vehicle, the gearwheel can be acted upon by another gearwheel driven by a draw bar. This latter gearwheel is then advantageously given a diameter which is twice that of the gearwheel 31, in order to annul the similar demultiplication existing between the gearwheels 13 and 14 (FIGURE 1) so as to keep the draw bar parallel to the planes of the steerable wheels.

Figure 11:
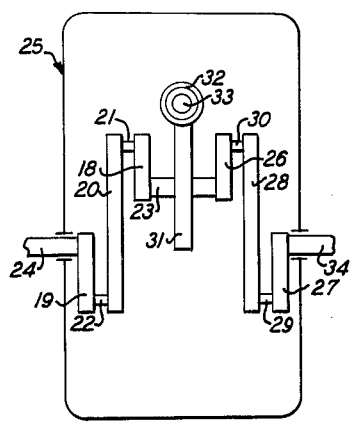
FIGURE 11 shows a steering differential based on the principle of FIGURE 10.
Figure 12:
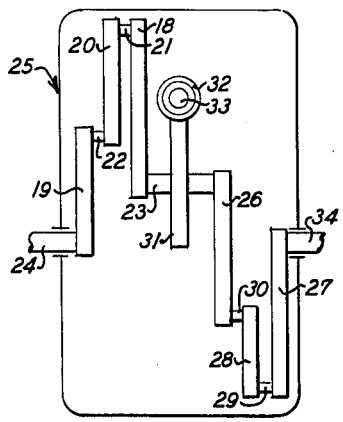
FIGURE 12 shows the same steering differential with cranks and links occupying other positions.
Figure 13:
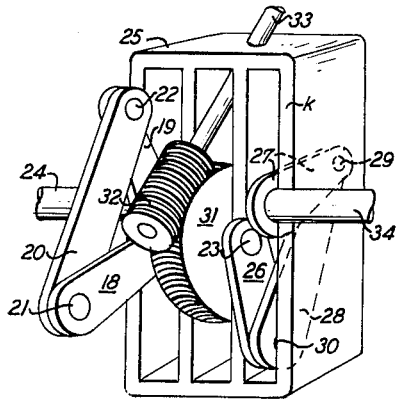
FIGURE 13 is a perspective view of a steering differential according to FIGURES 11 and 12.

Each of the other cranks of each pair is fixed to a shaft parallel to the driven shaft 23, namely the crank 19 to the shaft 24 and the crank 27 to the shaft 34. As indicated in FIGURE 10, the two pairs of cranks 18–19 and 26–27 are arranged on either side of the plane $k$ of the shafts. FIGURE 11 like FIGURE 10 shows the links in opposed positons parallel to one another, suitable for advancing the vehicle in a straight line along its longitudinal axis, whereas FIGURE 12 shows the arrangement of the cranks and links when the vehicle is travelling along a curved line (FIGURES 2 to 6), the crank 18 being positioned by way of example in the plane $k$ of the shafts 23, 24 and 34. FIGURE 13 shows the same apparatus in a diagrammatic perspective view, for the sake of easier understanding.

In order to obtain differentiation of the rotational movements of the outgoing shafts 24 and 34 which corresponds substantially to the turning of the wheels, it is appropriate to chose suitable ratios for the elements of the steering differential, more particularly the ratio between the length of the links and the offsetting of the shafts 24 and 34 from the shaft 23. The length of the links being generally obligatory and selected to be identical to that of the cranks, the offset distance of the outgoing shafts is essential in order to achieve substantially perfect concordance between the differentiation of the rotational movements of the outgoing shafts and that of the planes of the wheels.

It is to be remarked that if, in a steering differential according to FIGURES 11 to 13, the two pairs of cranks were arranged on one and the same side of the plane $k$, there would be an identical differentiation of the rotational movements of the outgoing shafts 24 and 34 relatively to the rotation of the driven shaft 23. One application of this effect will be described hereinafter.

Figure 14:
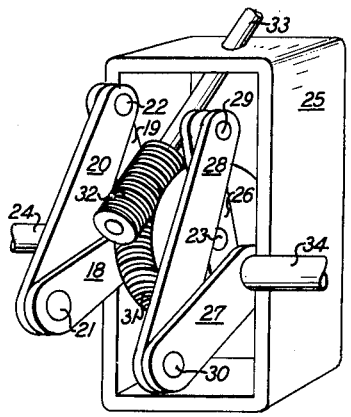
FIGURE 14 is a similar view of a modified steering differential.

Instead of positioning the outgoing shafts 24 and 34 in line on the same side of the driven shaft 23, they can also be situated on either side of the latter, as FIGURE 14 shows. In this case, however, the pair of cranks 26 and 27 must be arranged at the same side of the plank $k$ as the pair of cranks 18 and 19 in order to obtain differently differentiated movements of the outgoing shafts 24 and 34. By placing them on either side of this plane, there is obtained only an identical differentiation of the rotational movements of the outgoing shafts 24 and 34 relatively to the rotation of the driven shaft 23. Normally, the distance of the outgoing shaft 34 from the driven shaft 23 is the same as that of the outgoing shaft 24.

The steering differentials according to FIGURES 13 and 14 are easily adapted to asymmetrical vehicles, having wheels of different wheel base on their side of the longitudinal axis $f$ (FIGURES 7 and 8). In this case, the outgoing shafts 24 and 34 must be differently offset relatively to the driven shaft 23, and the offsetting difference of the outgoing shafts must be proportional to the difference in wheel base.

Figure 1:
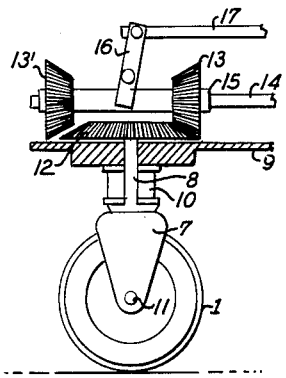
FIGURE 1 is a view of a steerable wheel.
Figure 15:
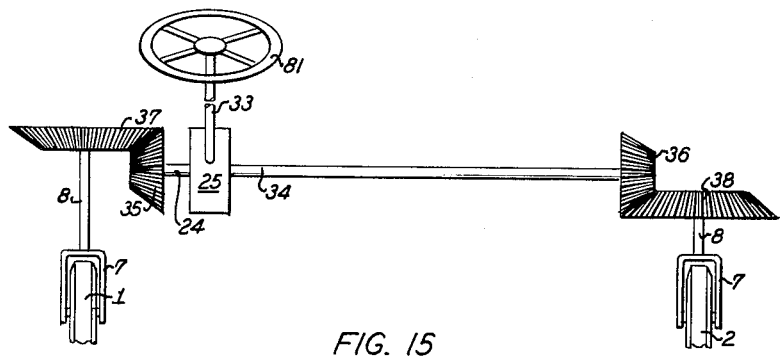
FIGURE 15 shows the transmission of the differentiated movements of the outgoing shafts to the wheels by means of bevel gearwheels.
Figure 16:
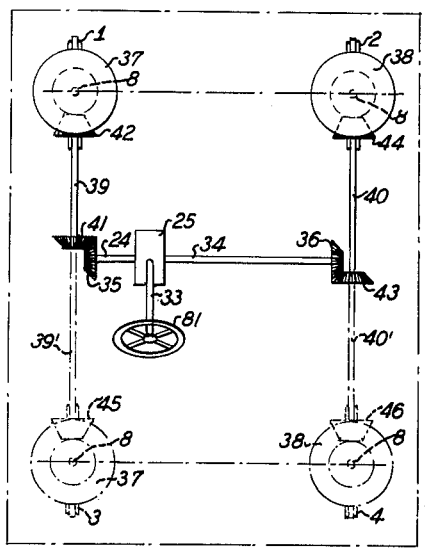
FIGURE 16 shows the transmission of the differentiated movements of the outgoing shafts to the wheels of a vehicle having two steerable wheels and, in broken lines, to the wheels of a vehicle having four steerable wheels.

The transmission of rotational movements of the outgoing shafts 24 and 34 to the wheels can be effected by bevel gearwheels or chain and chain wheels. These two means being technical equivalents, FIGURES 15 and 16 show only bevel gearwheel transmissions. If it is only a question of vehicles having two steerable wheels (FIGURE 2), the bevel gearwheels 35 and 36, meshing with the gearwheels 37 and 38 fixed to the pivots of the wheels 1 and 2, can be mounted directly on the shafts 24 and 34 (FIGURE 15) issuing from the casing 25 of the steering differential controlled by the steering wheel 81. The casing is then confined within the plane passing through the pivots 8, but the placing of the casing and the steering wheel can be made independent of this plane by interposing between the gearwheels 35, 37 and 36, 38 respectively shafts 39 and 40 which are provided at their ends with bevel gearwheels 41, 42 and 43, 44 respectively (FIGURE 15, part of the diagram shown in full lines). If the steering differential is to be mounted on a vehicle having four steerable wheels (FIGURES 3 to 8) it is easy to extend this transmission system to the wheels 3 and 4 by prolonging the shafts 39 and 40 by shafts 39' and 40' carrying at their ends bevel gearwheels 45 and 46 meshing with the gearwheels 37 and 38 mounted on the pivots 8 of the wheels 3 and 4 (FIGURE 16, part of the diagram shown in broken lines). It will be clear that the bevel gearwheels are arranged in such a manner that the wheels 1 and 2 pivot in the same direction and the wheels 3 and 4 in the opposite direction to that of the wheels 1 and 2. When the steering differential is also to provide for making all the wheels parallel, permitting the vehicle to advance in a straight line in any direction, the shafts going to the gearwheels of the pivots 8 of either the wheels 1 and 2 or preferably the wheels 3 and 4 are to have an opposite gearwheel which comes into action in order to rotate all the pivots 8 in one and the same direction, as shown in FIGURE 1 in the case of the gearwheels 13 and 13' which are mounted on a sleeve 15 rotating with the shaft 14. It will be clear that it is possible, with the same effect, to mount the counter-gearwheels on a sliding sleeve rotating with the pivots 8 either of the wheels 1 and 2 or of the wheels 3 and 4.

In a first form of embodiment of a differential permitting a vehicle to advanve selectively either in a straight line in the direction of its axis $f$ or along any desired curved line, or with the wheels held parallel to one another permitting of advancing in a straight line in any desired direction, advantageously a steering differential is used according to FIGURES 11 to 13 and the driven shaft is rotated in bearings adapted to be moved laterally until the driven shaft 23 comes into line with the outgoing shafts 24 and 34. It will be apparent that the rotational movement of the shafts 23, 24 and 34 becomes identical when the said shafts are aligned and that the pivots of all the wheels carry out the same angular movement and also rotate in the same direction as soon as the direction of rotation of the wheels 1 and 2 or of the wheels 3 and 4 has been reversed as indicated hereinbefore, and as is shown by way of example in FIGURE 1, where the sliding sleeve 15 rotating with the shaft 14 carries opposed bevel gearwheels 13 and 13', one or other of which can be engaged with the bevel gearwheel 12. If, at the moment when the bearings of the driven shaft 23 are moved, the planes of the wheels were parallel to one another they will remain parallel whilst their direction was modified by means of the steering wheel or draw bar.

Figure 17:
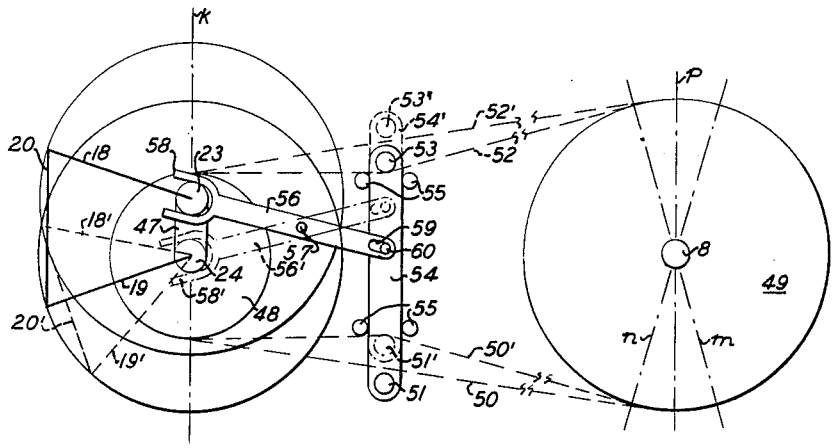
FIGURE 17 shows the principle of a form of embodiment of a steering differential permitting the selective movement of the vehicle with differentially turned wheels or with the wheels parallel in any one direction.
Figure 21:
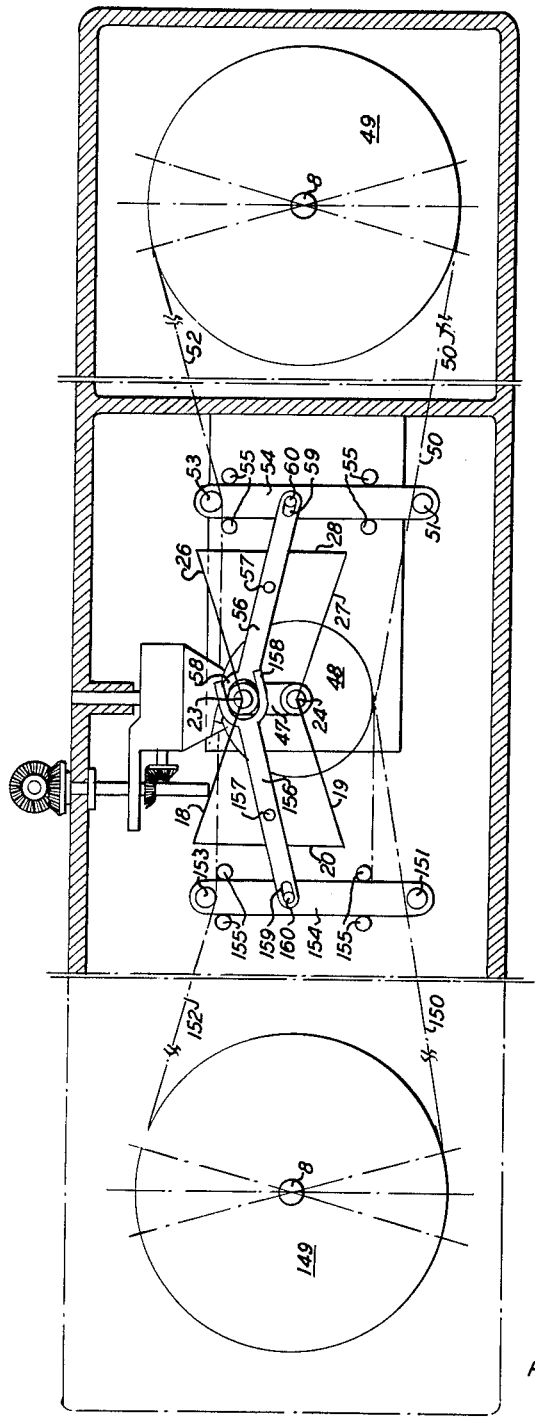
FIGURE 21 is a view similar to FIG. 17 and illustrates an embodiment of the invention in which the transmission to the wheel pivots is affected by a differential composed of chains and chain wheels.

In practice, the bearings of the shaft 23 are mounted on a suitably guided slider which is displaced by a lever or another suitable means on which there is also articulated a rod 17 actuating the two-arm lever 16 (FIGURE 1). In FIGURES 17 and 21, this slider takes the form of a slot 47 in which the driven shaft 23 and the outgoing shaft 24 occupy the ends in order to effect the differentiated rotational movement of the second of these shafts relatively to the rotational movement of the first, and wherein the first can be shifted in order to reach the position co-axial with the second. In FIGURE 17, there is shown the position of one of the pairs of cranks, for example the cranks 18 and 19, and of the link 20, in which the plane $p$ of the wheels 1 and 3 is parallel to the longitudinal axis $f$ of the vehicle, which position corresponds to that of FIGURES 10 and 11. By displacing the shaft 23 to align it on the shaft 24, the crank 18 is made to be displaced substantially parallel to itself, and it tends to reach the position 18', which position corresponds to displacement of the crank 19 fixed to the outgoing shaft 24 towards the position 19'. In the crank-links system there are thus produced stresses acting on the ends of the shafts 23 and 24 and, if the transmission towards the pivots 8 of the wheel forks is rigid, on the pivots of the wheels 1 and 3. The other pair of cranks, for example the cranks 26 and 27 connected by the link 28, (see FIGURES 10, 11 and 21), is made to urge in the opposite sense the other end of the shaft 23 and also the outgoing shaft 34 and the pivots 8 of the forks of the wheels 2 and 4. These stresses cannot be annulled except by modification of the planes of the wheels through an angle corresponding to half of the angle of displacement of the crank 19 towards 19'. Thus, the plane of the wheels 1 and 3 depending on the cranks 18 and 19 would reach the position $m$ and that of the wheels 2 and 4, depending on the cranks 26 and 27, the position $n$, and the movement of the vehicle with its wheels assumed to be parallel would be carried out under unfavourable conditions.

When the transmission of the rotational movements of the outgoing shafts to the pivots 8 is effected by bevel gearwheels, this disadvantage can be eliminated by disengaging the gearwheels 35–41 and 36–43 (FIGURE 16) before the displacement of the driven shaft 23 and re-engaging these gearwheels after the alignment of this shaft with the outgoing shafts, the planes of the wheels having first of all been brought to and held in parallel positions.

When the transmission of the rotational movements of the outgoing shafts to the pivots 8 is effected by chains and chain wheels, the disadvantage described hereinbefore is advantageously remedied by chains having a certain amount of slack, and shifting the slack from one run of a chain to the other by tensioning pulleys. FIGURE 17 shows diagrammatically a toothed wheel 48 fixed on the outgoing shaft 24 and a toothed wheel 49 which is mounted on a shaft 8 of a fork and has a diameter twice that of the toothed wheel 48, in order that the fork carries out a rotational movement through 180 degrees when the outgoing shaft carries out one complete revolution. These toothed wheels are connected by a chain whose slack can be taken up either at the run 50 by a tensioning pulley 51 or at the run 52 by a tensioning pulley 53. These pulleys are adapted to be shifted at the same time from 51 to 51' and 53 to 53'. For this purpose they are mounted on spindles mounted for example in a slide 54 which is guided laterally by guide wheels 55 and is adapted to occupy a position 54'. In both FIG. 17 and FIG. 21 which shows a similar arrangement of toothed wheels, the shafts 8 are shown in plan view for the sake of clearness, but it will be understood that such shafts are disposed at right angles to the shaft 24 (note FIG. 16) and that the runs 50, 52 of the chain connecting the toothed wheels are turned through 90° in the region between the toothed wheel 49 and the slide 54. As is also shown in both FIGS. 17 and 21, a two-arm lever 56, fulcrumed on a pin 57 mounted like the spindles of the guide wheels 55 on supports rigidly fast with the casing 25, comprises at one of its ends a fork 58 surrounding the driven shaft 23 and at its other end a slot 59 in which a pin 60 fixed to the slide 54 engages.

When the cranks are situated in the positions 18 and 19 and shafts 23 and 24 at the ends of the slot 47, the cranks are adapted to differentiate the rotational movement of the shaft 24 relatively to that of the driven shaft 23, but the wheels are in planes $p$ parallel to the longitudinal axis $f$ of the vehicle. The run 52 of the chain is tensioned by the pulley 53, whilst the run 50 is not loaded by the pulley 51. If the shaft 32 is then displaced to make it co-axial with the shaft 24, the shaft 23 actuates the two-arm lever 56 to bring it into the position 56' in FIGURE 17. Consequently, the slide 54 will end by occupying the position 54' and the tensioning pulley 53 the position 53', progressively releasing the slack of the chain 52. This slack enables the toothed wheel 48 to carry out a small rotational movement which is imposed on it by the crank 19 moving into the position 19'. The movement of the toothed wheel 48 is absorbed by the slack of the chain run 52 without the toothed wheel 49 fixed on the pivot 8 being subjected to stress and without the wheel being displaced from the plane $p$. On the other hand, the slack produced at the chain run 50 by the movement of the toothed wheel 48 is absorbed by the pulley 51 in proportion as it moves towards the position 51'. As soon as the shaft 23 is axially of the shaft 24 (and of course also co-axially with the outgoing shaft 34, urged by the pair of cranks 26–28 arranged at the other side of the plane $k$ of the shafts as indicated in FIGURES 10 and 21), the vehicle, its wheels being parallel, moves along a straight line in any direction imposed by the steering wheel or the draw bar. During all this time, the run 50' of the chain remains tensioned by the pulley 51' and the run 52' is in a straight line, not subjected to load by the pulley 53'. It will be understood from the foregoing that there is also fixed to the outgoing shaft 34 a toothed wheel 48 connected by a chain having runs 150, 152 to an enlarged toothed wheel 149 and that as shown in FIG. 21 there are associated with the cranks 26–28, a slide 154 located between guide wheels 155 and carrying pulleys 151, 153 and a pin 160, the latter of which is positioned in a slot 159 on one end of a lever 156 fulcrumed on a pin 157 and having at its other end a fork 158 surrounding the driven shaft 23, all of which parts function in a manner similar to that herein above described with respect to the comparable parts 49–58 associated with the cranks 18–20.

It will be clear that the apparatus for reversing the slack of the chain from one run to the other can be replaced by another equivalent means, for example a lever having three arms which is fulcrummed on the pin 57 at the bifurcation of the arms, one of which is provided with a fork 58 and each of the two others carried at its end a tensioning pulley 51, 53 respectively.

Figure 18:
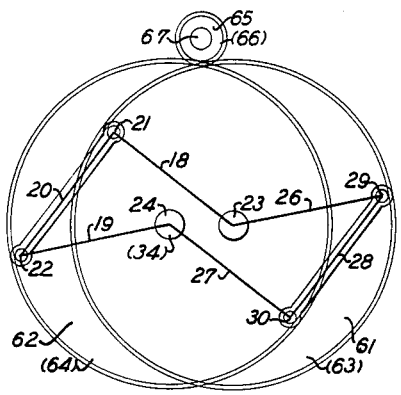
FIGURE 18 shows the principle of another form of embodiment of a differential wherein the cranks are incorporated in toothed wheels driven by pinions.
Figure 19:
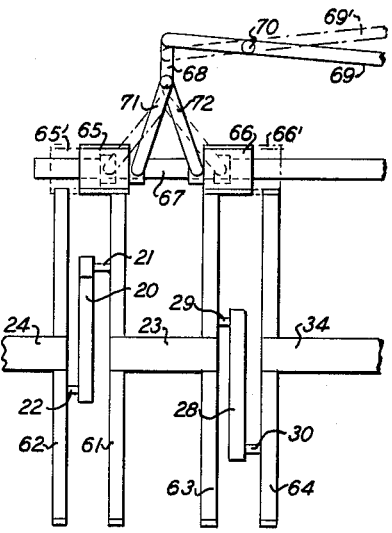
FIGURE 19 shows a constructional form of the embodiment shown in FIGURE 18.

In another form of embodiment of the steering differential which also permits movement of the vehicle selectively either in a straight line in the direction of the axis $f$ or along any curve, or with the wheels parallel to one another, in a straight line in any desired direction, each of the cranks 18, 19, 26 and 27 (represented in FIGURE 18 by single lines in order to facilitate understanding) is incorporated in a gearwheel. Thus there are obtained two pairs of gearwheels of which the wheels in each pair are connected to one another by a link, the wheels 61 and 62 by the link 20 pivotably mounted on the pins 21 and 22, and the wheels 63 and 64 by the link 28 pivotably mounted at the pins 29 and 30 (FIGURES 18 and 19). One of the wheels in each pair is fixed on an outgoing shaft, the wheel 62 on the shaft 24 and the wheel 64 on the shaft 34, whilst the other wheels of each pair, therefore the wheels 61 and 63, are mounted on a shaft 23 offset in parallel manner fixedly with respect to the co-axial shafts 24 and 34. One or both wheels 61 and 63 rotate freely on the common shaft 23.

The gearwheels are driven by sliding gearwheels 65 and 66 which are mounted on a driven shaft 67 arranged in the plane passing through the common secant of the two circles representing (in FIGURE 18) the gearwheels 61–63 and 62–64, parallel to the shafts 23, 24 and 34. The position of the sliding gearwheels is controlled by an appropriate means such that when the gearwheel 65 meshes with the gearwheel 61 mounted on the shaft 23, the gearwheel 66 meshes with the gearwheel 63 which is also mounted on the shaft 23, and when the gearwheel 65 is in the position 65' for acting directly on the wheel 62 fixed to the outgoing shaft 24, the other gearwheel is in the position 66' in order to act, in the same direction as the former, directly on the wheel 64 fixed on the outgoing shaft 34. If the gearwheels 65 and 66 are situated on the wheels 61 and 63 rotating on the shaft 23, there is of course the same differentiation in the rotational movement of the outgoing shafts as described hereinbefore in the case of the differential shown in FIGURES 11 and 13, and the vehicle can move as indicated in FIGURES 2 to 6. If, on the contrary, the gearwheels are situated in the positions 65' and 66', the outgoing shafts carry out the same rotaional movements as the driven shaft 67 and the planes of the wheels 1, 2, 3 and 4 remain parallel to one another (FIGURE 9), provided of course, that the direction of rotation of the pivots 8 of the wheels 1 and 2 or 3 and 4 has been reversed by a device similar to or identical with that which is shown in FIGURE 1. A device for controlling the position of the sliding gearwheels 65 and 66 can for example consist of a slide 68 which is actuated by a lever 69 pivotably mounted on a pin 70 and connected by the links 71 and 72 to the sleeves of the gearwheels 65 and 66. If the lever 69 is actuated to bring it into the position 69', the links move the sliding gearwheels apart from one another and make them engage the wheels 62 and 64. Also pivotably mounted on the lever 69 is the rod 17 (FIGURE 1). It would be possible advantageously to provide a similar device wherein each of the sliding gearwheels 65 and 66 is sub-divided into two parts each of which permanently meshes with one of the other gearwheels and is engageable on the shaft 67 in such a manner that the wheels 61 and 63 or the wheels 62 and 64 are operated.

This steering differential has the advantage of having great technical simplicity and requiring no constructional precautions for avoiding pivoting of the planes of the wheels during change-over from differentiated movement to parallel movement, this change-over being referred to hereinafter as switching. This switching, as well as switching in the opposite direction, is of course to be preceded in every case by making the planes of the wheels parallel to one another and to the longitudinal central axis of the vehicle.

A form of embodiment of a steering differential giving the same effect as the two preceding forms can also be derived from the apparatus shown in FIGURES 11 to 13 and makes use of the fact that there is a different differentation of the movements of the outgoing shafts relatively to the movement of the driven shaft when the two pairs of links are arranged on either side of the plane of the shafts, and that the differentiation of the movements of the outgoing shafts is identical in the case of the two outgoing shafts when the two pairs of links are arranged at one and the same side of the plane of the shafts. This steering differential, then, comprises three pairs of cranks two of which act alternately on the same outgoing shaft, the two cranks mounted on this shaft rotating freely and being adapted to be engaged on the said shaft in such a manner that it is optionally differentiated differently or identically with respect to the other outgoing shaft, depending on the crank which is engaged.

Figure 20:
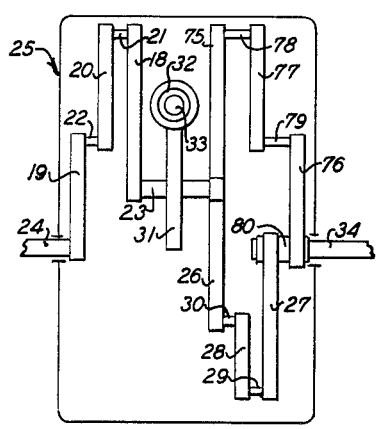
FIGURE 20 shows a form of embodiment of a steering differential comprising three pairs of cranks.

In FIGURE 20, the pairs of cranks 18–19 and 26–27 are arranged on either side of the plane $k$ of the shafts (FIGURE 10) and are situated in the same positions as in FIGURE 12. The third pair, comprising the cranks 75 and 76 connected to one another by the link 77 pivotably mounted on the crank pins 78 and 79, is arranged at the side of the cranks 18–19. The cranks 26 and 75, fixed to the driven shaft 23, form a constant angle with one another and can be made in one piece. The cranks 27 and 76 rotate freely on the outgoing shaft 34. A clutch device of known type is arranged at 80 and makes it possible to make one or other of these cranks fast with the outgoing shaft. The crank which is not engaged continues its rotational movement, entrained by the agency of the link by the crank which is mounted on the driven shaft, so that at the moment of switching it is in a good position for correct engagement.

A similar steering differential can also be obtained when the outgoing shafts are situated in a plane on either side of the driven shaft 23 (FIGURE 14). The use of this arrangement is advantageous for steering differentials intended to be provided in vehicles having different wheel bases (FIGURE 8) on the two sides of the longitudinal axis, for which the other forms of embodiment of the invention described hereinbefore in the case of vehicles having four steerable wheels would not be suitable.

Just like the steering differential according to FIGURES 18 and 19, the differentials having three pairs of cranks according to FIGURE 20 do not require any constructional precautions for avoiding pivoting of the planes of the wheels during switching from differentiated translational movement to parallel translational movement. Since the movements of the outgoing shafts remain differentiated relatively to the driven shaft during the movement of the vehicle with the wheels parallel, whilst being identical to one another, the turning of the steering wheel necessary for obtaining a given change of direction depends on the orientation of the planes of the wheels. Since the driver knows the latter, experience will enable him to find easily the suitable amount of turning which the steering wheel requires in order to obtain the desired change of direction.

The invention is not, of course, limited to the forms of embodiment which have been described and illustrated by way of example, and modifications could be made to this invention without departing from the scope thereof.

I claim:

1. Steering differential for towed or self-propelled vehicles having at least one pair of steerable wheels, comprising steering means connected to each steerable wheel in said pair to provide for unlimited turning of such wheel about a vertical axis passing through the center thereof, a pair of steering shafts associated with said wheels, transmission means connecting one end of each steering shaft to the steering means of each wheel, steering means for the vehicle, and differential means located between and connected to the other ends of said steering shafts, and including an axial member located between said other ends of said steering shafts and having a longitudinal axis parallel to, and in the normal differential steering relation of said axial member and steering shafts, offset with respect to the axes of said steering shafts, a first crank connected to each end of said axial member for rotational movement about the longitudinal axis thereof, a second crank connected to said other end of each of said steering shafts for rotational movement about the longitudinal axis of such shaft and associated in spaced parallel relation with one of said first cranks, and a link located between each associated pair of first and second cranks and connecting the outer ends of the arms of said cranks, the length of each of said links being less than the sum of the length of the arm of said first crank connected thereto and the length of the offset distance between said axial member and said steering shaft to which said link is connected in such normal differential steering relation of said axial member and steering shafts, and means connecting said first cranks in driven relation to said steering means for the vehicle, said first and second cranks and associated links being constructed and arranged to convert the rotational movements imparted to said first cranks by said vehicle steering means to a movement at the steering means of said wheels such as to move both wheels so that the planes thereof are maintained substantially perpendicular to straight lines passing through the centers of the wheels and the center of the turning circle of the vehicle, and in the normal differential steering relation of said axial member and said steering shafts, to convert the constant speed revolutions of said first cranks into variable angular speed revolutions each composed of one maximum and one minimum speed for said second cranks, and said transmission means being constructed and arranged to convert the variable angular speed revolutions imparted to said steering shafts by said second cranks into variable angular speed revolutions for said steering means in which each of such latter revolutions has two maximum and two minimum speeds.

2. Steering differential according to claim 1, in which said axial member is a driven shaft common to said first cranks, said connecting means connecting said common shaft in driven relation to said vehicle steering means.

3. Steering differential according to claim 2, characterised in that said steering shafts are spaced the same distance from said axial member.

4. Steering differential according to claim 3, characterised in that said axial member and said steering shafts are arranged in one and the same plane.

5. Steering differential according to claim 4, whereby the vehicle can be moved in the direction of its longitudinal axis or along any curved line, characterised in that the cranks in each associated pair are arranged on one and the same side of the plane of the shafts, the links being parallel when the planes of the steerable wheels are parallel to the longitudinal axis of the vehicle.

6. Steering differential according to claim 4, characterised in that said steering shafts are both arranged on the same side of said axial member, in alignment if the wheel base of the end wheels is identical on each side of the longitudinal axis of the vehicle.

7. Steering differential according to claim 6, permitting of moving the vehicle in the direction of its longitudinal axis or along any desired curved line, characterised in that the cranks in each associated pair are situated on either side of the plane of the shafts, the links being parallel when the planes of the steerable wheels are parallel to the longitudinal axis of the vehicle.

8. Steering differential according to claim 2 suitable for vehicles whose end wheels on either side of the longitudinal central axis of the vehicle have different wheel bases, characterised in that said steering shafts are spaced at different distances from said axial member, said distances being proportional to the lengths of the wheel bases.

9. Steering differential according to claim 2, characterised in that said steering shafts are arranged on either side of said axial member.

10. Steering differential according to claim 1, including means connected to said differential means and operable to shift said axial member to bring it into axial alignment with said steering shafts and thereby enable said differential means on operation of said vehicle steering means, to move said steerable wheels into parallelism with each other to enable rectilinear movement of the vehicle in a given direction other than in the direction of the longitudinal axis of the vehicle.

11. Steering differential according to claim 1 suitable for vehicles whose end wheels on either side of the longitudinal central axis of the vehicle have the same wheel base, characterised in that all the cranks are of the same length, and in that the length of the links is identical.

12. Steering differential according to claim 1 suitable for vehicles whose end wheels on either side of the longitudinal central axis of the vehicle have different wheel bases, characterised in that the lengths of the cranks and link associated with each steerable wheel are proportional to that of its wheel base.

13. Steering differential according to claim 1, characterised in that the rotational movements of said steering shafts are transmitted to said steering means for the steerable wheels by transmission means composed of bevel gearwheels.

14. Steering differential according to claim 1, characterised in that said first cranks are fixedly secured to said axial member, and said connecting means comprises said axial member, a gearwheel arranged on said axial member between said first cranks fixed thereto, and a driving member connected to said gear wheel and to said vehicle steering means.

15. Steering differential for towed or self-propelled vehicles having at least one pair of steerable wheels, comprising steering means connected to each steerable wheel in said pair to provide for unlimited turning of such wheel about a vertical axis passing through the center thereof, a pair of steering shafts associated with said wheels, transmission means connecting one end of each steering shaft to the steering means of each wheel, steering means for the vehicle, and differential means located between and connected to the other ends of said steering shafts, and including an axial member located between said other ends of said steering shafts and having a longitudinal axis parallel to the axes of said steering shafts, a first crank connected to each end of said axial member for rotational movement about the longitudinal axis thereof, a second crank connected to said other end of each of said steering shafts for rotational movement about the longitudinal axis of such shaft and associated in spaced parallel relation with one of said first cranks, and a link located between each associated pair of first and second cranks and connecting the outer ends of the arms of said cranks, and means connecting said first cranks in driven relation to said steering means for the vehicle, said first and second cranks and associated links being constructed and arranged to convert the rotational movements imparted to said first cranks by said vehicle steering means to a movement at the steering means of said wheels such as to move both wheels so that the planes thereof are maintained substantially perpendicular to straight lines passing through the centers of the wheels and the center of the turning circle of the vehicle, the four cranks of said two associated pairs of first and second cranks being in the form of gearwheels arranged in spaced, parallel relation, the two inner of said gearwheels being connected to said axial member and one at least being freely mounted on said axial member, the two outer gearwheels being fixed on said steering shafts and the latter having an invariable amount of offset relatively to said axial member and being arranged in line on one and the same side of said axial member, the gearwheels in each of the associated pairs of said inner and outer gearwheels being connected to one another by said links located therebetween, and said connecting means comprising a shaft actuated by said vehicle steering means, a pair of gearwheels slidably mounted on said shaft and each operatively associated with one of said pairs of gearwheels, and means for displacing said sliding gearwheels laterally in opposite directions to mesh either with said inner gearwheels in said pairs in order to constitute a steering differential permitting the vehicle to advance in the direction of its longitudinal axis or along any curved course, or with the outer gearwheels in said pairs in order to keep the wheels parallel to one another, and thereby enable rectilinear movements of the vehicle in any direction.

16. Steering differential for towed or self-propelled vehicles having at least one pair of steerable wheels, comprising steering means connected to each steerable wheel in said pair to provide for unlimited turning of such wheel about a vertical axis passing through the center thereof, a pair of steering shafts associated with said wheels, transmission means connecting one end of each steering shaft to the steering means of each wheel and being composed of chains and chain wheels arranged to transmit the rotational movements of said steering shafts to said steering means, steering means for the vehicle, and differential means located between and connected to the other ends of said steering shafts, and including an axial member located between said other ends of said steering shafts and having a longitudinal axis parallel to the axes of said steering shafts, a first crank connected to each end of said axial member for rotational movement about the longitudinal axis thereof, a second crank connected to said other end of each of said steering shafts for rotational movement about the longitudinal axis of such shaft and associated in spaced parallel relation with one of said first cranks, and a link located between each associated pair of first and second cranks and connecting the outer ends of the arms of said cranks, and means connecting said first cranks in driven relation to said steering means for the vehicle, said first and second cranks and associated links being constructed and arranged to convert the rotational movements imparted to said first cranks by said vehicle steering means to a movement at the steering means of said wheels such as to move both wheels so that the planes thereof are maintained substantially perpendicular to straight lines passing through the centers of the wheels and the center of the turning circle of the vehicle.

17. Steering differential for towed or self-propelled vehicles having at least one pair of steerable wheels, comprising steering means connected to each steerable wheel in said pair to provide for unlimited turning of such wheel about a vertical axis passing through the center thereof, a pair of steering shafts associated with said wheels, transmission means connecting one end of each steering shaft to the steering means of each wheel, steering means for the vehicle, and differential means located between and connected to the other ends of said steering shafts, and including an axial member located between said other ends of said steering shafts and having a longitudinal axis parallel to the axes of said steering shafts, a first crank connected to each end of said axial member for rotational movement about the longitudinal axis thereof, a second crank connected to said other end of each of said steering shafts for rotational movement about the longitudinal axis of such shaft and associated in spaced parallel relation with one of said first cranks, and a link located between each associated pair of first and second cranks and connecting the outer ends of the arms of said cranks, and means connecting said first cranks in driven relation to said steering means for the vehicle, said first and second cranks and associated links being constructed and arranged to convert the rotational movements imparted to said first cranks by said vehicle steering means to a movement at the steering means of said wheels such as to move both wheels so that the planes thereof are maintained substantially perpendicular to straight lines passing through the centers of the wheels and the center of the turning circle of the vehicle, said differential means including a movable bearing for said axial member enabling the latter to be displaced laterally, a guide for said movable bearing, and means for effecting this displacement of the bearing comprising a lever connected to said bearing and selectively operable to offset said axial member relative to said steering shafts to permit the vehicle to advance in the direction of its longitudinal axis or to follow any curved line, and to bring said axial member into line with said steering shafts in order to bring the planes of all the wheels into parallelism with one another in order to permit the vehicle to advance in a straight line in any one direction other than in the direction of the longitudinal axis of the vehicle.

18. Steering differential according to claim 17, characterised in that said steering means connected to each steerable wheel comprises a first bevel gear wheel, and said transmission means comprises paired oppositely arranged bevel gearwheels, and means slidably supporting said paired bevel gear wheels to enable the latter to mesh alternately with each such first bevel gearwheel, in order to rotate all the wheels in the same direction when said axial member and said steering shafts are in the aligned position, and to rotate the rear wheels in a direction opposite that of the front wheels when said steering shafts are in an offset position relatively to said axial member, and means connected to said slidable means and mounted on sleeves adapted to slide on their shafts and to be controlled by said means for shifting the bearing of said axial member.

19. Steering differential according to claim 17, characterized in that said transmission means comprises a first toothed wheel fixed on each steering shaft, a second toothed wheel fixed to each wheel steering means, a chain connecting each associated first and second toothed wheel in driving relation, and a double chain tensioning device adapted to shift a slack intentionally given to the chain alternately to one or the other run of the said chain so as to compensate by means of the chain slack for stresses which are produced during the shifting of said bearing for the axial member, by modifying the angle between the two cranks in each associated pair of first and second cranks, and thereby preventing the said stresses, if the chains were tensioned, from causing undesirable rotation of said steering means for the wheels.

20. Steering differential for towed or self-propelled vehicles having at least one pair of steerable wheels, comprising steering means connected to each steerable wheel in said pair to provide for unlimited turning of such wheel about a vertical axis passing through the center thereof, a pair of steering shafts associated with said wheels, transmission means connecting one end of each steering shaft to the steering means of each wheel, steering means for the vehicle, and differential means located between and connected to the other ends of said steering shafts, and including an axial member located between said other ends of said steering shafts and having a longitudinal axis parallel to the axes of said steering shafts, a first crank connected to each end of said axial member for rotational movement about the longitudinal axis thereof, a second crank connected to said other end of each of said steering shafts for rotational movement about the longitudinal axis of such shaft and associated in spaced parallel relation with one of said first cranks, and a link located between each associated pair of first and second cranks and connecting the outer ends of the arms of said cranks, and means connecting said first cranks in driven relation to said steering means for the vehicle, said first and second cranks and associated links being constructed and ararnged to convert the rotational movements imparted to said first cranks by said vehicle steering means to a movement at the steering means of said wheels such as to move both wheels so that the planes thereof are maintained substantially perpendicular to straight lines passing through the centers of the wheels and the center of the turning circle of the vehicle, a third crank connected to one end of said axial member so as to extend therefrom in directly opposed relation to said first crank connected to said one end of said axial member, a fourth crank connected to said other end of said steering shaft associated with said one end of said axial member and extending therefrom in a direction opposite to the direction of extension of said second crank connected to said associated steering shaft, and a link located between said third and fourth cranks and connecting the outer ends of the arms thereof, said third crank and said first crank associated therewith being fixedly connected to said one end of said axial member, and means detachably connecting said fourth crank and said second crank associated therewith to said associated steering shaft, and being operable to alternately connect said fourth and second cranks to such steering shaft.

21. Steering differential for towed or self-propelled vehicles having at least one pair of steerable wheels and a steering pivot associated with each wheel, comprising a support, a driving shaft rotatably mounted on said support, a first crank arm of fixed length secured to each end of said driving shaft, two driven shafts connected to said steerable wheels and each rotatably mounted on said support in parallel relation to said driving shaft and at an eccentricity distance from said driving shaft, a second crank arm of fixed length secured to one end of each of said driven shafts and paired with one of said first crank arms, a connecting rod of fixed length connecting to each other the first and second crank arms in each pair thereof to enable the transmission of the rotational movement of said driving shaft to each of said driven shafts, the fixed length of each of said connecting rods being less than the sum of the fixed length of the first crank arm associated therewith and the length of the eccentricity distance between said driving shaft and the driven shaft to which such connecting rod is connected in the differential steering position of said driving and driven shafts, and the lengths of the connecting rod and the paired first and second crank arms connected to each driven shaft being such that for each constant speed revolution of said driving shaft and said first crank arms, each of said second crank arms will make one revolution at a variable angular speed passing through one maximum and one minimum speed in such revolution, one of said second crank arms being dragged through such revolution and the other of said second crank arms being pushed through such revolution by their associated connecting rods and first crank arms, and transmission gearing connecting the other end of each driven shaft to a steering pivot of said steerable wheels, the transmission ratio of said gearing being such that said driven shafts on each two successive revolutions thereof, each composed of one maximum and one minimum speed, imparts to the associated steering pivots one revolution of a variable speed having two maximum and two minimum speeds.

22. Steering differential as defined in claim 21 for vehicles whose end wheels at either side of the longitudinal central axis of the vehicle have the same wheel base, in which the fixed length of each of said connecting rods is equal to the fixed length of each of its associated first and second crank arms, and in which the eccentricity distances from said driving shaft to said driven shafts are the same.

23. Steering differential as defined in claim 21 for vehicles whose end wheels at either side of the longitudinal central axis of the vehicle have different wheel bases, in which the fixed lengths of said connecting rods and of their connected crank arms in the respective pairs thereof are proportional to the respective different wheel bases.

24. Steering differential as defined in claim 21 for vehicles whose end wheels at either side of the longitudinal central axis of the vehicle have different wheel bases, in which said driven shafts are spaced from said driving shaft at different eccentricity distances proportional to the respective different wheel bases.

References Cited by the Examiner

UNITED STATES PATENTS

| | | | |
|---|---|---|---|
| 1,681,893 | 8/1928 | Barshell | 280—91 X |
| 2,470,496 | 5/1949 | Krilanovich | 280—91 |
| 2,756,066 | 7/1956 | Ludowici | 280—91 |
| 2,814,499 | 11/1957 | Schlechter | 280—93 |
| 2,842,376 | 7/1958 | Krilanovich | 280—91 |
| 2,915,319 | 12/1959 | Kumler et al. | 280—91 |
| 3,075,784 | 1/1963 | Beyerstedt | 280—91 |
| 3,130,981 | 4/1964 | Christenson | 280—93 |

KENNETH H. BETTS, *Primary Examiner.*

A. HARRY LEVY, *Examiner.*